(12) United States Patent
Carson et al.

(10) Patent No.: US 7,166,978 B2
(45) Date of Patent: Jan. 23, 2007

(54) MOTOR TEMPERATURE SENSOR SYSTEM AND METHOD TO DETERMINE MOTOR PERFORMANCE

(75) Inventors: David M. Carson, Newtown, CT (US); Richard Hall, Southbury, CT (US)

(73) Assignee: Kendro Laboratory Products, LP, Newtown, CT (US)

(*) Notice: Subject to any disclaimer, the term of this patent is extended or adjusted under 35 U.S.C. 154(b) by 0 days.

(21) Appl. No.: 11/144,826

(22) Filed: Jun. 6, 2005

(65) Prior Publication Data
US 2005/0225274 A1 Oct. 13, 2005

Related U.S. Application Data

(62) Division of application No. 10/633,533, filed on Aug. 5, 2003, now Pat. No. 6,903,525.

(51) Int. Cl.
*H02P 7/00* (2006.01)

(52) U.S. Cl. ............. 318/432; 318/434; 318/634; 318/641; 318/431; 318/708; 318/738; 318/471; 318/930; 310/315; 310/16; 310/68 C; 388/934

(58) Field of Classification Search ............... None
See application file for complete search history.

(56) References Cited

U.S. PATENT DOCUMENTS

| | | | |
|---|---|---|---|
| 5,612,605 A * | 3/1997 | Tao .................... | 318/805 |
| 5,650,700 A * | 7/1997 | Mutoh et al. ............. | 318/432 |
| 6,205,405 B1 * | 3/2001 | Pouvreau .................. | 702/41 |
| 6,529,135 B1 * | 3/2003 | Bowers et al. ............ | 340/648 |
| 6,548,981 B1 * | 4/2003 | Ishii et al. ............... | 318/538 |

* cited by examiner

*Primary Examiner*—Lincoln Donovan
*Assistant Examiner*—Erick Glas
(74) *Attorney, Agent, or Firm*—Baker & Hostetler LLP

(57) ABSTRACT

An electric motor system includes an electric motor, a temperature sensor mounted therein capable of measuring a local temperature and generating a temperature related signal, and a processor configured to calculate an actual temperature of a rotor magnet from the temperature related signal, and an actual output torque from the actual rotor magnet temperature. A method for determining the actual output torque of a motor includes sensing a temperature within the motor, calculating a rotor magnet temperature from the sensed temperature, and calculating the actual output mechanical torciue from the rotor magnet temperature.

12 Claims, 6 Drawing Sheets

MOTOR TEMPERATURE SENSOR SYSTEM AND METHOD TO DETERMINE MOTOR PERFORMANCE

CROSS REFERENCE TO RELATED APPLICATIONS

This application claims priority to and is a divisional of U.S. patent application Ser. No. 10/633,533, filed on Aug. 5, 2003, now U.S. Pat. No. 6,903,525, entitled, MOTOR TEMPERATURE SENSOR SYSTEM ANT) METHOD TO DETERMINE MOTOR PERFORMANCE, the disclosure of which is hereby incorporated by reference in its entirety.

FIELD OF THE INVENTION

The present invention relates generally to the field of electric motors. More particularly, the present invention relates to determining electric motor performance using a sensed internal temperature of the motor.

BACKGROUND OF THE INVENTION

Conventional brushless direct current (DC) motors rely on the magnetic flux created by permanent magnets located on the rotor interacting with magnetic fields from the stator to generate a mechanical torque. Indeed, the output mechanical torque generated by a brushless DC motor is directly proportional to the magnetic flux density of the rotor magnets. Often, performance characteristics of a brushless DC motor are evaluated based on the output mechanical torque generated by the motor as a function of the input stator current. In many applications, it is critical to accurately determine the output mechanical torque produced by a motor for a known stator current.

The magnetic flux of the rotor magnets and its relationship with the magnetic fields induced by the stator current is a function of the motor temperature. It is well known that the magnetic flux density of magnetic materials (i.e., rotor magnets) decreases as temperature increases, resulting in degradation of motor performance. Herethereto, conventional approaches to this problem have been to simply recognize a performance degradation during high-temperature operation and attempt to try to regulate the ambient temperature, or to recommend only certain operating temperature conditions.

It would therefore be desirable to provide systems and methods for accurately sensing the temperature of the rotor magnets to provide more accurate output torque information.

SUMMARY OF THE INVENTION

The foregoing needs are met, to a great extent, by the present invention, wherein in one aspect an apparatus is provided to sense the temperature of the rotor magnets of a brushless DC motor.

In accordance with one embodiment of the present invention, an electric motor system is provided having an electric motor with a temperature sensor mounted inside the motor capable of measuring local temperature and a processor that utilizes a temperature signal from the temperature sensor to determine an output mechanical torque generated by the motor.

In accordance with another embodiment of the present invention, a centrifuge system is provided, comprising an electric motor having at least one temperature sensor, a motor shaft, and a specimen holder connected to the motor shaft a processor in communication with the temperature sensor to determine an output mechanical torque generated by the motor, In accordance with another embodiment of the present invention, a method is provided for determining the output mechanical torque generated by an electric motor having rotor magnets. The method comprises the steps of sensing local temperature at a location inside the motor and calculating an output mechanical torque generated by the motor based on the determined temperature.

In accordance with yet another embodiment of the present invention, a system is provided for determining the output mechanical torque generated by an electrical motor having rotor magnets. The system comprises means for sensing local temperature at a location inside the motor, and means for calculating an output mechanical torque generated by the motor based on the determined temperature.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention. The invention will now be described with reference to the drawing figures, in which like reference numerals refer to like parts throughout.

DETAILED DESCRIPTION

Figure 1:
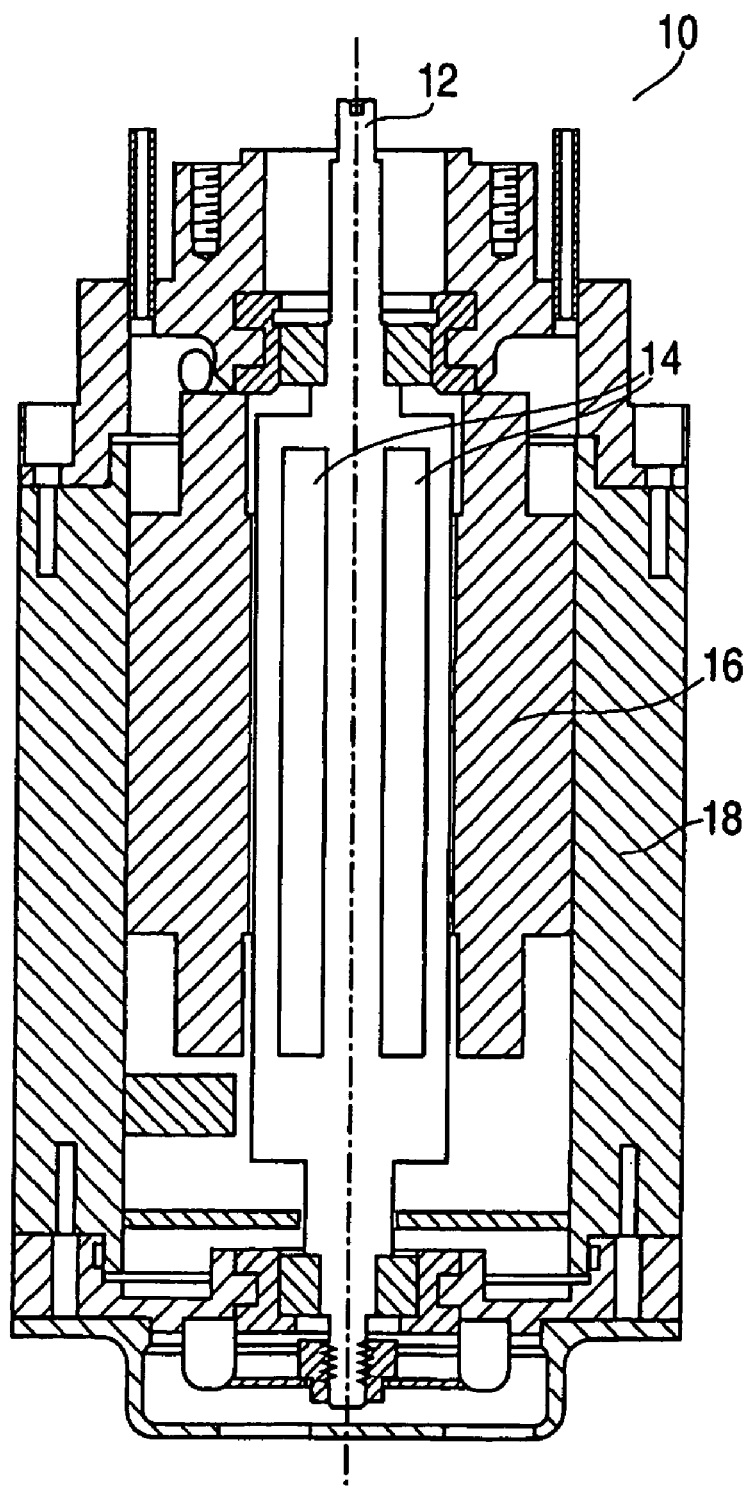
FIG. 1 is a cross-sectional view of a prior art brushless DC motor.

In some preferred embodiments, the invention provides a system and method that determines electrical motor performance using at least one sensed internal temperature of the motor. Preferably, the temperature of one or more rotor magnets is sensed. Preferred embodiments of the invention will now be described with reference to the drawing figures in which like reference numbers refer to like elements throughout.

FIG. 1 is a cross-sectional view of a conventional brushless DC motor 10 having a rotor 12, rotor magnets 14, a stator 16, and a motor housing 18. An output mechanical torque is produced on the rotor 12 as a result of the interaction of the magnetic flux of the rotor magnets 14 and the rotating magnetic flux induced by the stator current. These components of brushless DC motors are well known in the art, and therefore for the purposes of this discussion is not further discussed herein.

Typically employed magnetic materials experience a decrease in flux density as the temperature of the magnetic material increases. Therefore, as the temperature of the rotor magnets 14 increases, the magnetic flux density $B_r$ of the rotor magnets 14 decreases.

Figure 2:
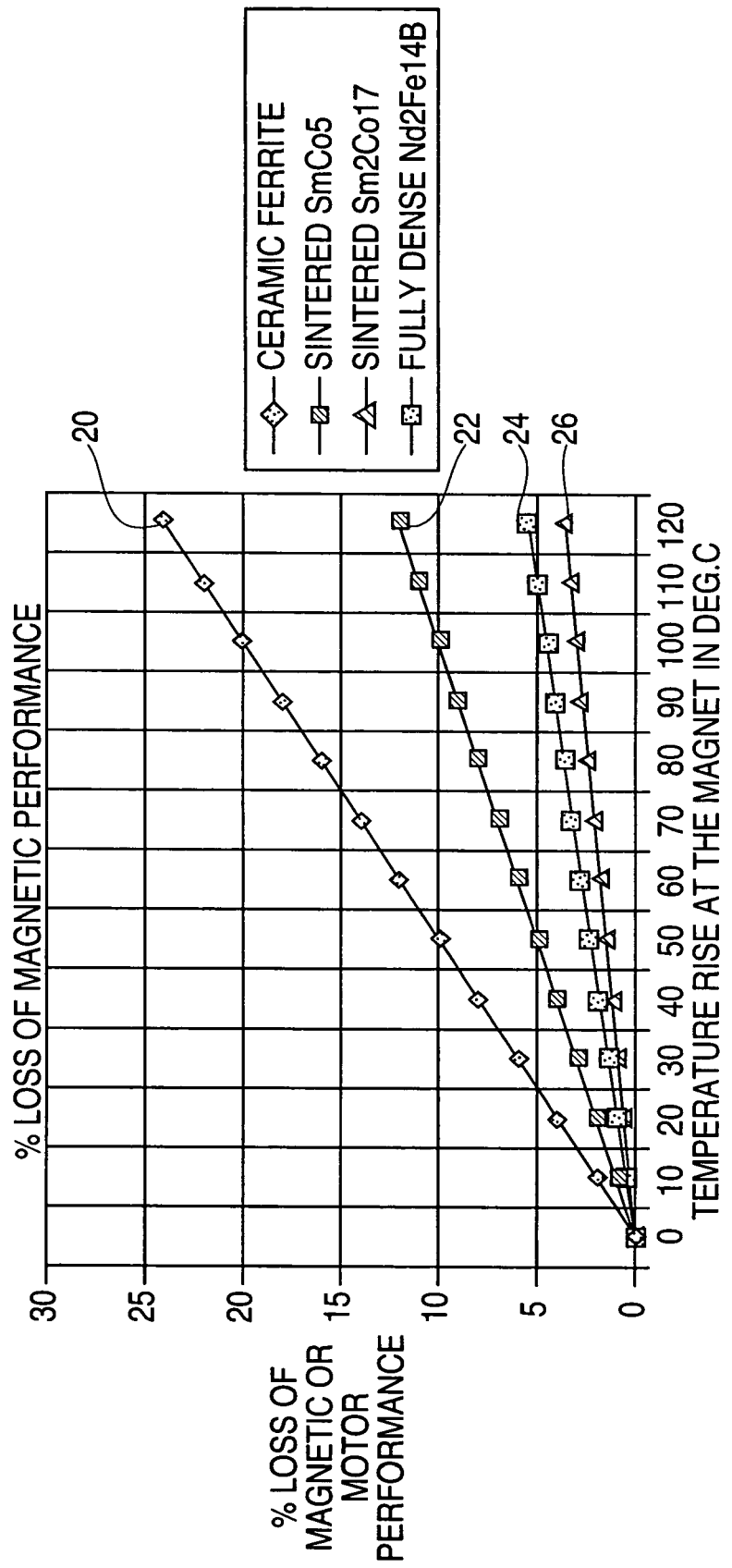
FIG. 2 is a temperature vs. magnetic flux density graph for four permanent magnet materials.

FIG. 2 is a graphical illustration of the relationship between magnetic flux density and temperature over the range 0–120° C. for four permanent magnet materials commonly employed as rotor magnets in brushless DC motors. Over the operating range of most brushless DC motors, for example 0–140° C., the inverse relationship between temperature and magnetic flux density is considered to be generally linear for most permanent magnet materials. From FIG. 2, it is evident that ceramic ferrite 20 experiences a drop in magnetic flux density of 0.2% per degree Celsius over the range 0–120° C. Similarly, fully dense $Nd_2Fe_{14}B$, 22, exhibits a drop in magnetic flux density of 0.10% per degree Celsius, where sintered $SmCo_5$, 24, exhibits a drop in magnetic flux density of 0.045% per degree Celsius, and sintered $Sm_2Co_{17}$ 26 exhibits a drop in magnetic flux density of 0.03% per degree Celsius over the range 0–120° C.

Although FIG. 2 illustrates the relationship between magnetic flux density and temperature for four permanent magnet materials commonly employed as rotor magnets in brushless DC motors, it should be appreciated that other permanent magnet materials can be used as rotor magnets as deemed suitable by one ordinary skill in the art.

Often, motor performance characteristics are evaluated based on the output mechanical torque τ generated as a function of input stator current $I_s$. Moreover, in many applications, it is critical to accurately determine the output mechanical torque τ of a brushless DC motor 10 as a function of stator current $I_s$. For example, in a centrifuge system energy calculations are based on assumed motor torque based on the input stator current $I_s$. Calculations of acceleration rates, deceleration rates, system energy, and rotational inertia are based on an accurate estimate of the output mechanical torque. If these calculations are incorrect because of an inaccurate output mechanical torque, then the centrifuge material may be improperly centrifuged.

It is well known in the art that the output mechanical torque of a brushless DC motor 10 is directly proportional to $I_s$. This relationship is expressed empirically as $$\tau = k_t I_s, \qquad \text{(Eq. 1)}$$

where the torque constant $k_t$ of the motor 10 is a function of and directly proportional to the magnetic flux density B of the rotor magnets 14. Therefore, because an increase in the temperature of the rotor magnets 14 causes a decrease in the magnetic flux density $B_r$ of the rotor magnets 14, an increase in temperature of the rotor magnets 14 causes a decrease in the value of the torque constant $k_t$. Thus, the torque constant $k_t$ is inversely proportional to the temperature of the rotor magnets 14. Consequently, an increase in the temperature of the rotor magnets 14 results in a diminished output mechanical torque τ. Therefore, knowing the temperature of the rotor magnets 14 permits determination of the output mechanical torque τ, of a brushless DC motor.

In order to determine the relationship between the temperature of the rotor magnets 14 and the output mechanical torque τ of a brushless DC motor 10, a first step is to determine the maximum value of the torque constant $k_t$ of the motor 10. The maximum value of the torque constant $k_t$ is the value of the torque constant $k_t$ of the cold motor 10 operating at room temperature (20° C.). The torque constant $k_t$ of a brushless DC motor 10 is proportionally equivalent to the voltage constant $k_E$ of the back electromotive force (EMF) of the motor. Accordingly, the voltage constant $k_E$ value of the motor 10 is directly related to the magnetic flux density $B_r$ of the rotor magnets 14 and is thus inversely proportional to the temperature of the rotor magnets 14. Therefore, once the voltage constant $k_E$ value of a cold brushless DC motor 10 operating at 20° C. is known, a simple conversion of units yields the maximum torque constant $k_t$, in-lbs/amp, of the motor 10.

As disclosed in U.S. Provisional Patent Application 60/381,824, filed May 21, 2002 titled "Back EMF Measurement to Overcome the Effects of Motor Temperature Change", the disclosure of which is hereby incorporated by reference in its entirety, the voltage constant $k_E$ value of a brushless DC motor 10 is readily determined by driving the rotor with a second motor and measuring the back EMF (i.e., the voltage across two stator phases) and the revolutions per minute (RPM) of the rotor. The torque constant of the motor 10 is then easily calculated from the voltage constant $k_E$ value of the motor 10.

Equipped with the maximum torque constant $k_t$ of a brushless DC motor 10, the relationship between the temperature of the rotor magnets 14 and the output mechanical torque τ is readily determined. Due to the inverse relationship between magnetic flux density $B_r$ and magnet temperature and the direct relationship between output mechanical torque τ and the magnetic flux density $B_r$ of the rotor magnets 14, the percent decrease in output mechanical torque τ for a brushless DC motor 10 operating with rotor magnets 14 at a particular temperature $T_{M1}$, for example, is given by $$\Delta\tau = (T_M - T_{M1}) \cdot (\Delta B_r), \qquad \text{(Eq. 2)}$$

where Δτ represents the percent decrease in output mechanical torque, $T_M$ represents the current temperature of the rotor magnets 14, $T_{M1}$ represents the temperature at the first test point, and $\Delta B_r$ represents the percent decrease in magnetic flux density of the permanent magnet material used for the rotor magnets 14. Using the result of Eq. 2, the percent of motor torque remaining at a particular temperature $\tau_{remaining}$ is then calculated from $$\tau_{remaining} = (100 - \Delta\tau). \qquad \text{(Eq. 3)}$$

Finally, from Eq. 1, the actual output torque τ of the motor 10 for a known stator current $I_s$ and particular rotor magnet 14 temperature is found from $$\tau = [k_{t(20° C.)} I_s] \cdot \tau_{remaining} \qquad \text{(Eq. 4)}$$

Figure 3:
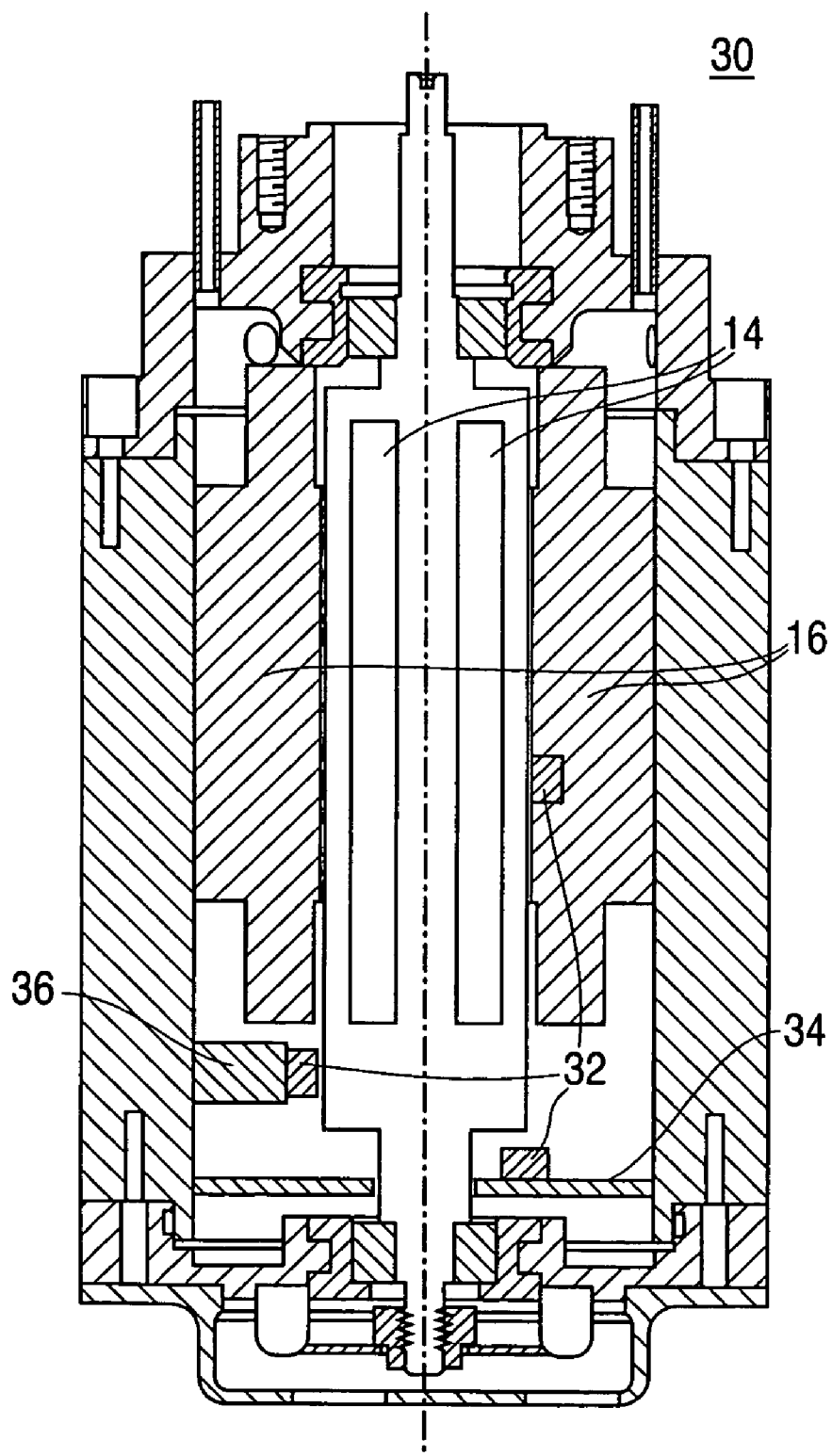
FIG. 3 is a cross-sectional view of a brushless DC motor illustrating exemplary temperature sensor locations according to an embodiment of this invention.

In a preferred embodiment of the present invention, it is possible to accurately determine the temperature of the rotor magnets 14 of a brushless DC motor 10 using sensors mounted inside of the motor 10. FIG. 3 is a cross-sectional view of a brushless DC motor 30 illustrating exemplary locations for mounting temperature sensors. As demonstrated by FIG. 3, temperature sensors 32 can be mounted on the commutation board 34 or in the motor housing 36 as close to the rotor magnets 14 as reasonably possible to obtain a relatively accurate temperature. Additionally, the temperature sensor(s) 32 maybe situated adjacent to the stator 16, as desired. It should be appreciated by one of ordinary skill in the art that the temperature sensors 32 can be located in other positions, as according to design preferences, without departing from the scope and spirit of this invention. That is, the temperature sensor(s) may be placed at any position inside the envelope of the motor.

Figure 4:
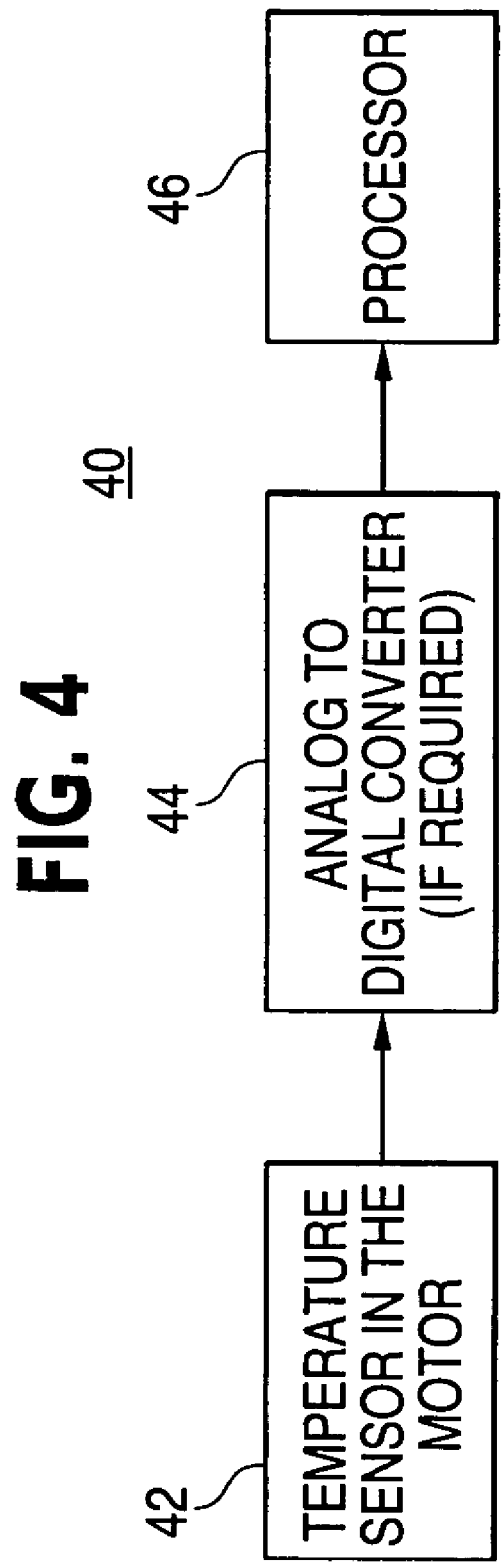
FIG. 4 is a block diagram of an exemplary temperature sensor device.

FIG. 4 depicts a block diagram of an exemplary temperature sensor circuit 40 according to this invention. A temperature sensor 42—preferably, but not necessarily, an integrated circuit (IC) type sensor—is used to determine the local temperature at the sensor position inside the motor 10. It should be apparent that though this preferred embodiment employs the use of an IC-type sensor to sense the rotor magnet 14 temperature, other devices capable of sensing temperature may be used as deemed suitable by one of ordinary skill in the art, such as, for example, optical, chemical, pressure, methods or schemes that are directly or indirectly capable of detecting temperature or changes in temperature.

In operation, if the output of the temperature sensor 42 is a digital signal, the temperature signal is passed directly to logic/decision device 46, illustrated here as a processor. If the output of the temperature sensor 32 is an analog signal, the signal is fed to the analog-to-digital (A/D) converter 44. The converted digital temperature signal is then passed from the A/D converter 44 to the processor 46. The processor 46 is then used to determine the actual temperature of the rotor magnets 14. While FIG. 4 is discussed in the context of using digital signals or digital processing, it should be appreciated that a completely analog, hybrid, or analog-digital system may be used without departing from the spirit and scope of the invention.

In order to determine with a described accuracy the temperature of the rotor magnets 14 from the temperature signal relayed by the temperature sensor 42, the offset between the local temperature sensed by the sensor 42 and the actual temperature of the rotor magnets 14 may be first determined through experimental measurements or an initial calibration or preset. To determine the offset of the rotor magnet 14 temperature from the temperature sensor 42 readings, the rotor magnets 14 may be heated to at least two different known temperatures, $T_{M1}$ and $T_{M2}$, and the corresponding temperatures measured by the temperature sensor 42 $T_{S1}$ and $T_{S2}$, respectively, would be recorded. Using this data and assuming that the offset of the temperature sensor 42 readings from the rotor magnet 14 temperature exhibits a linear relationship, it is possible to accurately determine the temperature $T_M$ of the rotor magnets 14, for a temperature sensor 42 reading $T_S$ using the expression $$T_M = [(T_{M2} - T_{M1})/(T_{S2} - T_{S1})] \cdot$$

$$T_S + T_{M2} - [(T_{M2} -$$

$$T_{M1})(T_{S2} - T_{S1})] \cdot T_{S2} \quad \text{(Eq.5)}$$

It should be appreciated that although this embodiment uses a linear interpolation algorithm to account for the offset of the rotor magnet 14 temperature from the temperature sensor 42 reading, other algorithms, whether linear or non-linear, for determining the offset of the rotor magnet 14 temperature from the temperature sensor 42 reading may be used as deemed suitable by one of ordinary skill in the art.

After determining the actual temperature of the rotor magnets 14, the processor 46 is used to determine the output mechanical torque $\tau$ for the known input stator current $I_s$ and the determined rotor magnet 14 temperature using Eqs. 2–4. From the determined value of the output mechanical torque, the processor 46 can be used to calculate other performance characteristics of the motor 10, including, but not limited to acceleration rates, deceleration rates, system energy of an unknown load.

Figure 5:
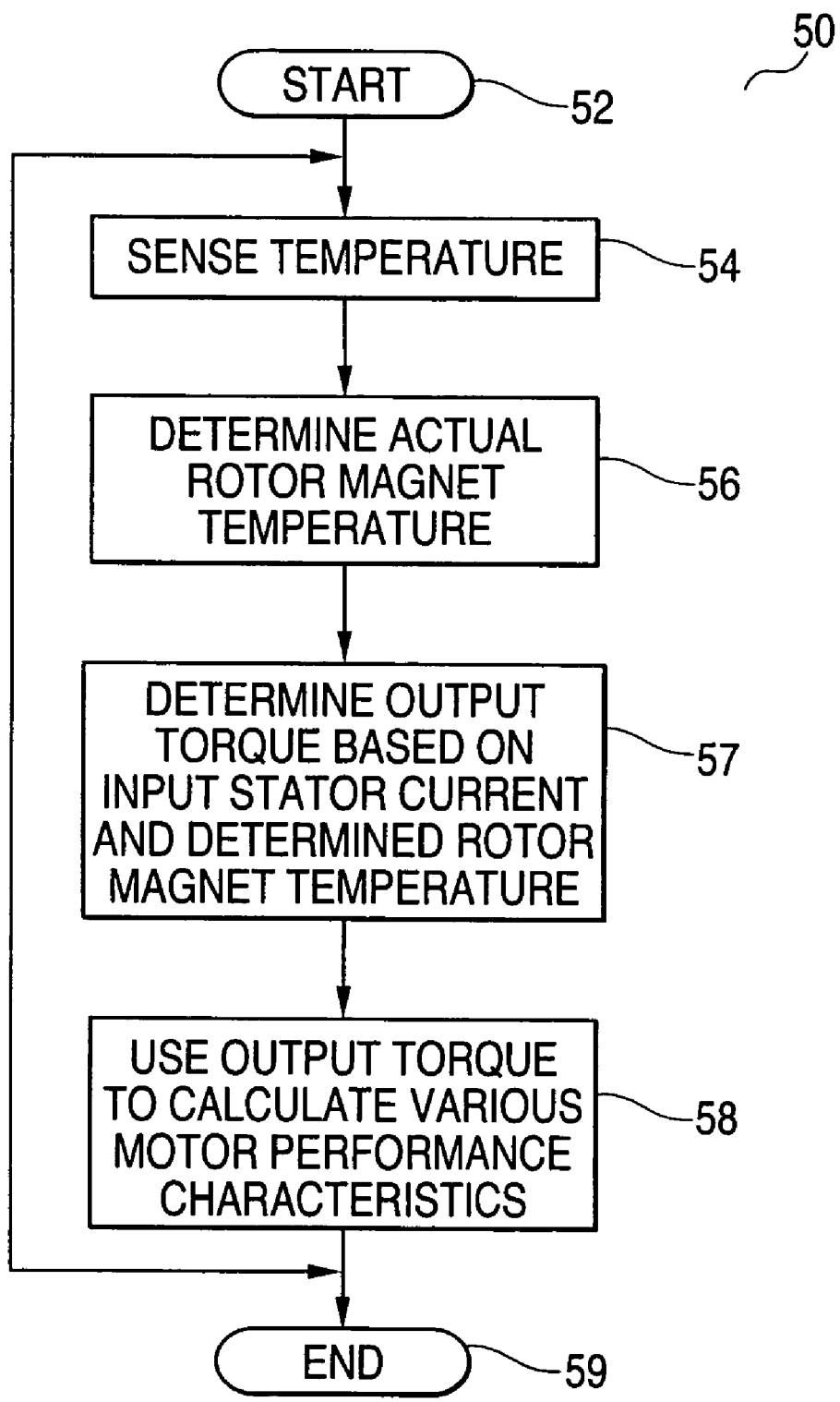
FIG. 5 is a flowchart illustrating an exemplary process for determining performance characteristics of a brushless DC motor.

FIG. 5 is a flowchart illustrating an exemplary process 50 for determining changes in the performance characteristics of a motor 10 according to this invention. The exemplary process 50 begins at step 52, whereby one or a plurality of temperature sensors 42 mounted inside of the motor 10 are used to sense the local temperature at the designated sensor position(s) at step 54. Using the reading of the temperature sensor(s) 42 at step 54, the exemplary process 50 proceeds to step 56 whereby the actual rotor magnet 14 temperature is determined according to the process described in FIG. 4, or any other suitable process. Once the actual temperature of the rotor magnets 14 has been accurately determined in step 56, the output torque of the motor 10 is calculated in step 57 based on the input stator current and the accurately determined rotor magnet 14 temperature from step 56. The process 50 then proceeds to step 58 where performance characteristics of the motor 10 can be calculated. Such performance characteristics can include, but are not limited to acceleration rates, deceleration rates, system energy, or the rotational inertia of an unknown load. After the completion of step 58, the exemplary process 50 may proceed to step 59 to end the process, or optionally cycle to step 54 and repeat itself periodically or aperiodically, as desired.

While FIG. 5 illustrates one exemplary process for determining changes in performance characteristics of an electric motor, it should be appreciated by one of ordinary skill in the art that other processes can be employed to use the data collected by the temperature sensor 42 to determine changes in performance without departing from the spirit or scope of this invention. For example, the order of the steps in FIG. 5 could be rearranged, the number of steps could be reduced, or additional steps could be added.

Furthermore, although FIGS. 3–5 describe the use of a temperature sensor 42 to determine the temperature of the rotor magnets 14, of a motor, it should be appreciated by one of ordinary skill in the art that the temperature sensor 42 could also be used to accurately determine the temperature of other components of the motor that affect motor performance such as, but not limited to, the stator 16 or motor housing 18 temperatures without departing from the spirit and scope of this invention.

In addition, while the above figures illustrate the invention as being described in the context of sensing rotor magnet 14 temperatures in a brushless DC motor 10, it should be appreciated by one of ordinary skill in the art that the invention could also be used to accurately determine magnet temperature in other types of permanent magnet electric motors.

Figure 6:
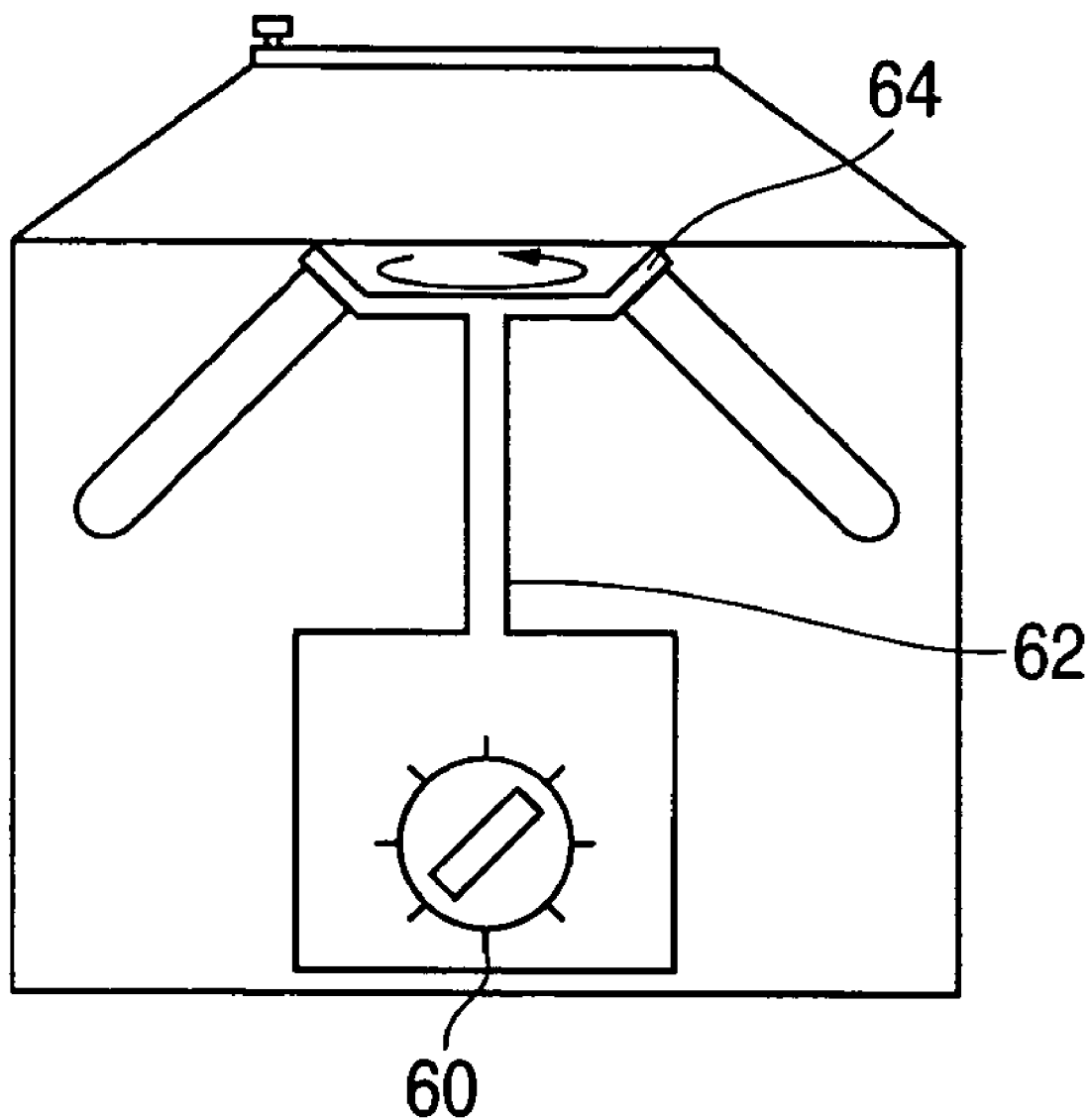
FIG. 6 is a block diagram of an exemplary centrifuge.

Electric motors are often used in centrifuges, such as for example laboratory centrifuges. FIG. 6 is a block diagram of an exemplary centrifuge 60 according to this invention. The exemplary centrifuge 60 has a motor 62, turntable shaft 64, and centrifuge rotor 66. The output torque generated by the centrifuge motor 60 drives the turntable shaft 64 which in turn causes the centrifuge rotor 66 to rotate. In the exemplary centrifuge system 60, energy calculations are based on the motor torque which is calculated from sensing the rotor magnet temperature according to systems and methods according to this invention. The systems and methods described above may be used to increase the accuracy of the estimate of the output mechanical torque generated by the motor, thus increasing the accuracy of the energy calculations for centrifuge applications. Therefore, parameters such as acceleration rates, deceleration rates, system energy, and rotational inertia, are accurately determined based on the output mechanical torque generated by the motor 60.

Furthermore, it should be appreciated by one of ordinary skill in the art that other uses and functions may be arrived at by utilizing the internal temperature information or flux determination. For example, if the temperature sensed by the temperature sensors is over a predetermined over temperature value, the exemplary centrifuge 60 may initiate a shutdown or recovery operation. Thus, in addition to accurately determining the mechanical torque (or other temperature affected metrics), safety considerations may be exploited.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An electric motor system comprising:
   an electric motor having at least one rotor magnet;
   a temperature sensor mounted inside the motor capable of measuring a local temperature and generating a temperature related signal;
   a processor configured to calculate an instantaneous temperature of the at least one rotor magnet from the temperature related signal and to calculate an instantaneous output mechanical torque of the motor from the instantaneous temperature.

2. The motor of claim 1, wherein the temperature sensor is mounted on a commutation board.

3. The motor of claim 1, wherein the temperature sensor is an integrated circuit type temperature sensor.

4. The motor of claim 1, further comprising:
   an analog-to-digital converter disposed between the temperature sensor and the processor.

5. The motor of claim 4, wherein the temperature sensor is an analog temperature sensor, wherein the analog to digital converter converts a transmitted analog temperature signal into a digital temperature signal.

6. The motor of claim 1, wherein the temperature sensor is a digital temperature sensor.

7. The motor of claim 1, wherein the processor is housed outside of the motor.

8. A centrifuge, comprising:
   an electric motor having at least one temperature sensor;
   a processor that communicates with the temperature sensor to calculate an instantaneous rotor temperature and determine an instantaneous output mechanical torque generated by the motor therefrom;
   a motor shaft; and
   a specimen holder, connected to the motor shaft.

9. A method for determining the output mechanical torque generated by an electric motor, comprising the steps of:
   sensing a local temperature of at least one location inside the motor;
   calculating an instantaneous rotor magnet temperature from the local temperature; and
   calculating the instantaneous output mechanical torque generated by the motor based on the instantaneous rotor magnet temperature.

10. The method of claim 9, further comprising the step of:
    comparing the calculated temperature of the rotor magnet to a predetermined response temperature; and
    adjusting an operation of the motor based on a result of the comparison.

11. The method of claim 9, wherein the step of sensing the local temperature at a location inside the motor is performed using temperature sensors.

12. A system for determining the output mechanical torque generated by an electric motor, comprising:
    means for sensing a local temperature of at least one location inside the motor;
    means for calculating a an instantaneous rotor magnet temperature from the local temperature; and
    means for calculating the instantaneous output mechanical torque generated by the motor based on the instantaneous rotor magnet temperature.

* * * * *

UNITED STATES PATENT AND TRADEMARK OFFICE
CERTIFICATE OF CORRECTION

| | |
|---|---|
| PATENT NO. | : 7,166,978 B2 |
| APPLICATION NO. | : 11/144826 |
| DATED | : January 23, 2007 |
| INVENTOR(S) | : David M. Carson et al. |

It is certified that error appears in the above-identified patent and that said Letters Patent is hereby corrected as shown below:

Title Page Item (57) Abstract
Line 11, please replace "torciue" with --torque--;

Column 1
Cross Reference to Related Applications
Line 11, please replace "ANT)" with --AND--;

Column 8
Line 41, please delete "a".

Signed and Sealed this

Twenty-seventh Day of May, 2008

JON W. DUDAS
*Director of the United States Patent and Trademark Office*